(12) United States Patent
Yang et al.

(10) Patent No.: US 11,761,501 B2
(45) Date of Patent: Sep. 19, 2023

(54) FRICTION SIMULATING DEVICE

(71) Applicant: Suzhou ITI Motor Technology Co., Ltd., Changshu (CN)

(72) Inventors: Jie Yang, Changshu (CN); Yongxing Gao, Changshu (CN); Jun Chen, Changshu (CN)

(73) Assignee: Suzhou ITI Motor Technology Co., Ltd., Changshu (CN)

(*) Notice: Subject to any disclaimer, the term of this patent is extended or adjusted under 35 U.S.C. 154(b) by 0 days.

(21) Appl. No.: 18/064,875

(22) Filed: Dec. 12, 2022

(65) Prior Publication Data
US 2023/0193970 A1 Jun. 22, 2023

(30) Foreign Application Priority Data
Dec. 16, 2021 (CN) .......................... 202111535968.0

(51) Int. Cl.
*B60T 17/22* (2006.01)
*F16D 65/28* (2006.01)
(Continued)

(52) U.S. Cl.
CPC ............ *F16D 65/28* (2013.01); *B60T 17/221* (2013.01); *F16D 2065/787* (2013.01);
(Continued)

(58) Field of Classification Search
CPC ............... F16D 65/28; F16D 2065/787; F16D 2065/788; F16D 2121/16; F16D 2125/06; B60T 17/221
See application file for complete search history.

(56) References Cited

U.S. PATENT DOCUMENTS 9,463,784 B2 * 10/2016 No .................. B60T 17/221

FOREIGN PATENT DOCUMENTS

| CN | 108105293 A | 6/2018 |
| CN | 108263356 A | 7/2018 |

(Continued)

OTHER PUBLICATIONS

Office Action issued in Chinese Application No. CN202111535968.0, dated Jan. 26, 2022, with machine translation.
(Continued)

*Primary Examiner* — Freddie Kirkland, III
(74) *Attorney, Agent, or Firm* — HAMRE, SCHUMANN, MUELLER & LARSON, P.C.

(57) ABSTRACT

The invention discloses a friction simulating device, comprising: a first driving shaft, a first driving gear, a second driving gear, a second driving shaft, a plurality of friction plates and a driving mechanism. The first driving gear is coaxially fixedly connected to the first driving shaft. The second driving gear is located on a radial outer side of the first driving gear and is provided coaxially with the first driving gear. The second driving shaft is coaxially fixedly connected to the second driving gear. The plurality of friction plates being provided subsequently between the first driving gear and the second driving gear in a direction of an axis of the first driving gear, wherein some of the friction plates are axially movably connected to the first driving gear in a circumferential direction, and the other friction plates are axially movably connected to the second driving gear in the circumferential direction. The friction simulating device is able to simulate the friction applied to the wheels of the vehicle by the ground.

11 Claims, 8 Drawing Sheets

(51) Int. Cl.
  *F16D 121/16*  (2012.01)
  *F16D 65/78*  (2006.01)
  *F16D 125/06*  (2012.01)

(52) U.S. Cl.
  CPC .... *F16D 2065/788* (2013.01); *F16D 2121/16* (2013.01); *F16D 2125/06* (2013.01)

(56) References Cited

FOREIGN PATENT DOCUMENTS

CN　　108263357 A　　7/2018
CN　　113670499 A　　11/2021

OTHER PUBLICATIONS

Notification to Grant issued in Chinese Application No. CN202111535968.0, dated Feb. 15, 2022, with machine translation.

* cited by examiner

FRICTION SIMULATING DEVICE

TECHNICAL FIELD

Embodiments of the invention relates to the field of automotive test and repair equipment, and in particular to a friction simulating device.

TECHNICAL BACKGROUND

The performance of a vehicle needs to be tested when the vehicle was manufactured. When testing the vehicle, it is necessary to use a dynamometer and other devices to provide a load for the vehicle under test. When ABS (Antilock Brake System) and TCS (Traction Control System) of the vehicle are tested, the rate of change of speed of a wheel (angular acceleration) varies greatly, so a low-inertia permanent magnet synchronous motor (i.e., the dynamometer mentioned above) is needed to provide a load to the vehicle. This permanent magnet synchronous motor is used to simulate a dramatic rate of change of speed of the wheels to perform ABS and TCS tests.

The inventors found that there are at least the following problems in the prior art: low inertia permanent magnet synchronous motors are very expensive. In addition, the dynamometer is directly connected to the vehicle's half-axle, when doing a ABS test, the speed of dynamometer will be switched frequently at high frequencies between holding (the wheel's speed is 0 rpm at this moment, i.e., the dynamometer should also provide a speed to the wheel to be tested at 0 rpm) and a speed same as that of the speed of the vehicle, while the speed of dynamometer will be switched at high frequencies between slipping and flying of the wheel and a speed same as that of the vehicle when doing a TCS test.

When ABS and TCS tests are performed, test scenario needed for the vehicle being tested cannot be completely simulated even if a low-inertia permanent magnet synchronous motor is used, since the speed of the dynamometer should be switched at high frequencies and the inertia of the permanent magnet synchronous motor still exists. This approach can only be used for functional verification of the vehicle, while it is not accurate enough when being used for optimization and test of calibration of the vehicle.

SUMMARY

One object of the present invention is to provide a friction simulating device, which can realistically simulate the friction applied to the vehicle by the ground, thus being able to improve the accuracy of tests of vehicle.

Embodiments of the present invention provide friction simulating device, comprising:
a first driving shaft;
a first driving gear being coaxially fixedly connected to the first driving shaft;
a second driving gear being located on a radial outer side of the first driving gear and being provided coaxially with the first driving gear;
a second driving shaft being coaxially fixedly connected to the second driving gear;
a plurality of friction plates being provided subsequently between the first driving gear and the second driving gear in a direction of an axis of the first driving gear, wherein some of the friction plates are axially movably connected to the first driving gear in a circumferential direction, and the other friction plates are axially movably connected to the second driving gear in the circumferential direction;
a driving mechanism operably pressing or releasing the friction plates in a direction of an axis of the first driving shaft; wherein the driving mechanism comprises: a pressing member, a piston and a cylinder, wherein
the pressing member and the piston operably press against both sides of the plurality of friction plates in the direction of the axis of the first driving gear respectively;
the pressing member is fixedly connected to the second driving gear;
an end of the piston away from the plurality of friction plates is located in the cylinder and is sealedly slideable along an inner wall of the cylinder in the direction of the axis of the first driving gear;
a liquid filling port is provided on a segment of the cylinder away from the plurality of friction plates.

In an embodiment, the friction plates connected to the first driving gear and the friction plates connected to the second driving gear are alternately arranged subsequently in the direction of the axis of the first driving gear.

In an embodiment, the plurality of friction plates are friction rings provided coaxially with the first driving gear.

In an embodiment, the pressing member is an annular end plate being sleeved on a radial outer side of the first driving shaft, and a radial outer end of the annular end plate is fixedly connected to the second driving gear.

In an embodiment, the friction simulating device further comprises:
an annular cover body being fixed coaxially to a radial outer annular surface of the second driving shaft, wherein a radial outer end of the annular cover body is fixedly connected to the second driving gear;
an intermediate ring being affixed to an inner side of the annular cover body and coaxially fixedly connected to the second driving shaft, wherein the cylinder is formed by the annular cover body and the intermediate ring.

In an embodiment, the driving mechanism further comprises:
a pressing ring being connected to a radial inner side of the piston;
a rebound member being provided on a side of the pressing ring toward the pressing member, wherein the rebound member abuts against the pressing ring, and the rebound member operably pushes the pressing ring to move in a direction away from the pressing member.

In an embodiment, the first driving shaft is coaxially fixedly connected to the first driving gear by a connecting ring, and the first driving shaft has a oil storage cavity inside;
the friction simulating device further comprises a plurality of cooling oil passages, each of the cooling oil passages is connected to the oil storage cavity at one end and is open at an outer annular surface of the first driving gear at the other end.

In an embodiment, a plurality of oil discharge passages are provided on the second driving gear in a radial direction of the second driving gear, and the plurality of oil discharge passages run through the second driving gear in the radial direction.

In an embodiment, the cooling oil passages are divided into a plurality of groups, outlets of each group of the cooling oil passages are arranged subsequently in the direction of the axis of the first driving shaft, and the plurality of groups of the cooling oil passages are provided around the direction of the axis of the first driving gear.

In an embodiment, the friction simulating device further comprises a housing covering over the first driving gear, the second driving gear and the plurality of friction plates, wherein the first driving shaft and the second driving shaft both pass through a housing wall of the housing and are rotatably connected to the housing;

wherein the housing is provided with an oil outlet.

In an embodiment, wherein the first driving shaft and the second driving shaft are provided coaxially and are opposite to each other, the second driving shaft is provided with an oil inlet cavity connected to the oil storage cavity, and the oil inlet cavity is connected to the oil outlet through a pipe;

wherein the friction simulating device further comprises a pressure pump provided on the pipe.

DESCRIPTION OF DRAWINGS

One or more embodiments are illustrated exemplarily by means of drawings in the accompanying drawings corresponding thereto. These exemplary illustrations do not constitute a limitation of the embodiments, and elements in the accompanying drawings having the same reference number are indicated as similar elements, and the drawings in the accompanying drawings do not constitute a limitation of scale unless specifically stated.

Figure 1:
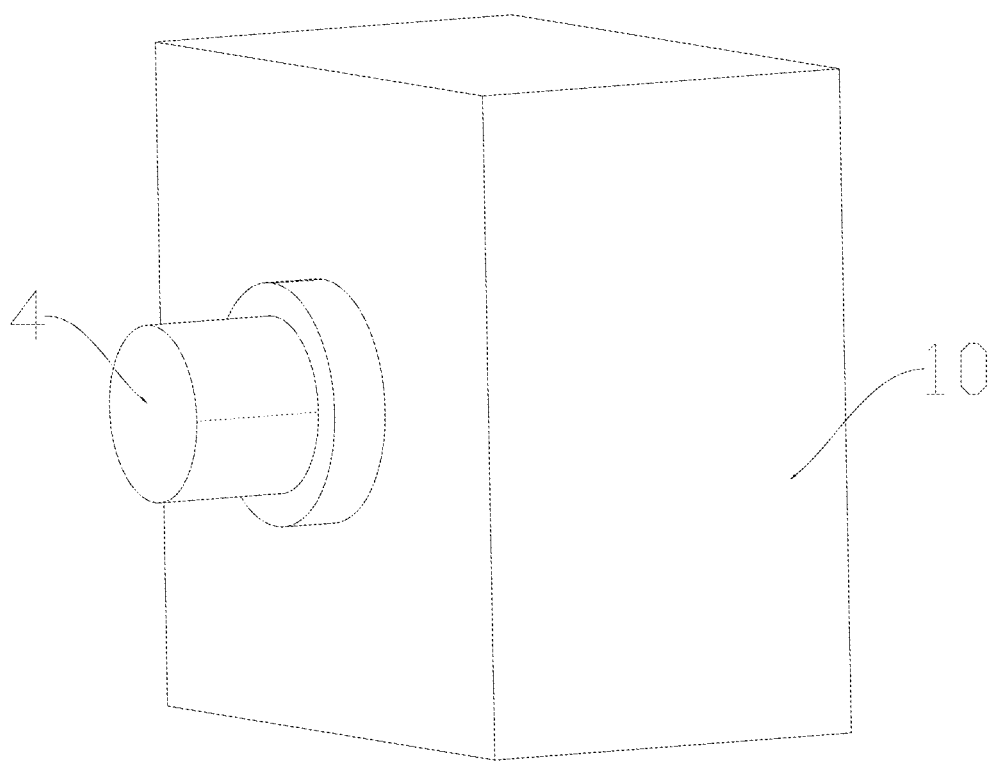
FIG. 1 is a schematic diagram of the structure of the friction simulating device according to an embodiment of the present invention.
Figure 2:
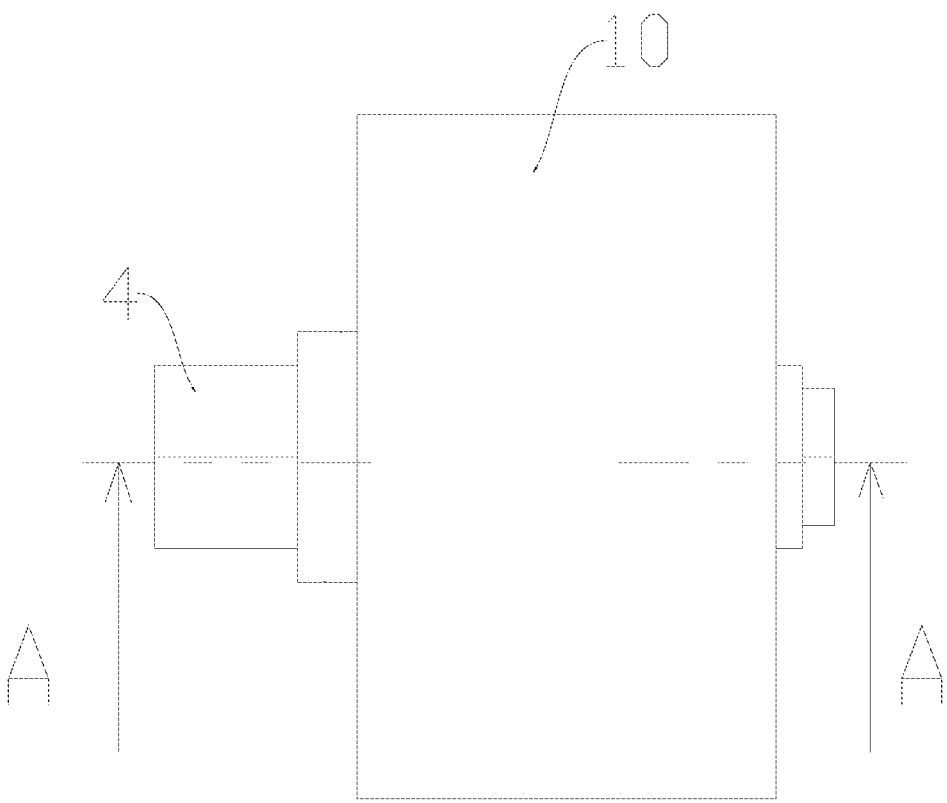
FIG. 2 is a schematic diagram of the structure of the friction simulating device according to the embodiment of the present invention.

Description of the Reference Number:

1, first driving shaft; 11, oil storage cavity; 12, cooling oil passage; 13, connecting ring; 2, first driving gear; 21, first tooth-shaped surface; 3, second driving gear; 31, second tooth-shaped surface; 32, oil discharge passage; 4, second driving shaft; 41, oil inlet cavity; 42, pressure oil passage; 5, friction plate; 51, first friction plate; 511, third tooth-shaped surface; 52, second friction plate; 521, fourth tooth-shaped surface; 61, pressing member; 62, piston; 63, cylinder; 71, annular cover; 72, connecting plate; 8, intermediate ring; 81, liquid filling port; 91, pressing ring; 92, rebound member; 93, fixing ring; 94, U-ring; 10, housing; 101, bearing; 102, supporting ring; 103, friction simulating device; 104, dynamometer; 107, tested vehicle.

EMBODIMENTS

In order to make the purpose, technical solutions and advantages of the embodiments of the present invention clearer, each of the embodiments of the present invention will be described in detail below in conjunction with the accompanying drawings. However, it will be understood by those of ordinary skill in the art that in each embodiment of the present invention, many technical details are presented to enable the reader to better understand the present application. However, even without these technical details and various variations and modifications based on each of the following embodiments, the technical solutions claimed to be protected by the present application can be achieved.

In the description below, certain specific details are set forth for the purpose of illustrating various embodiments of the disclosure in order to provide a thorough understanding of various embodiments of the disclosure. However, those skilled in the art will recognize that embodiments may be practiced without one or more of these specific details. In other instances, familiar devices, structures and techniques associated with the present application may not be shown or described in detail so as to avoid unnecessarily confusing the description of the embodiments.

Unless the context requires otherwise, the word "comprises" and its variants such as "includes" and "has" should be understood as open-ended and inclusive throughout the specification and claims. The meaning should be interpreted as "including, but not limited to".

Each embodiment of the present invention will be described in detail hereinafter in connection with the accompanying drawings, so that the objects, features and advantages of the present invention can be more clearly understood. It should be understood that the embodiments shown in the accompanying drawings are not intended to limit the scope of the present invention, but only to illustrate the substantial spirit of the technical solutions of the present invention.

References to "one embodiment" or "an embodiment" throughout the specification indicate that a particular feature, structure, or characteristic described in conjunction with the embodiment is included in at least one embodiment. Thus, the occurrence of "in one embodiment" or "in an embodiment" throughout the specification need not all refer to the same embodiment. In addition, particular features, structures, or characteristics may be combined in any manner in one or more embodiments.

As used in the specification and appended claims, the singular forms "a" and "the" include plural referents, unless the context clearly provides otherwise. It should be noted that the term "or" is generally used in a sense that includes "and/or" unless the context clearly states.

In the following description, for clarity of illustration of the structure and mode of operation of the present invention, various directional terms will be used to describe the present invention, but words such as "front", "rear", "left", "right", "outer", "inner", "outward", "inward", "upper", "lower", and the like, should be understood as convenient terms and should not be construed as limiting terms.

The following description describes a friction simulating device of the present invention with reference to the accompanying drawings, specifically as shown in FIGS. 1~5. The friction simulating device 103 comprises: a first driving shaft 1, a first driving gear 2, a second driving gear 3, a second driving shaft 4, a plurality of friction plates 5 and a driving mechanism. The first driving gear 2 is coaxially fixedly connected to the first driving shaft 1. The second driving gear 3 is located on a radial outer side of the first driving gear 2 and is provided coaxially with the first driving gear 2. The second driving shaft 4 is coaxially fixedly connected to the second driving gear 3. The plurality of friction plates 5 are provided subsequently between the first driving gear 2 and the second driving gear 3 in the direction of the axis of the first driving gear 2. Some of the friction plate 5 are axially movably connected to the first driving gear 2 in the circumferential direction, the other of the friction plate 5 are axially movably connected to the second driving gear 3 in the circumferential direction. The driving mechanism is able to press or release the friction plates 5 in the direction of the axis of the first driving shaft 1.

Figure 4:
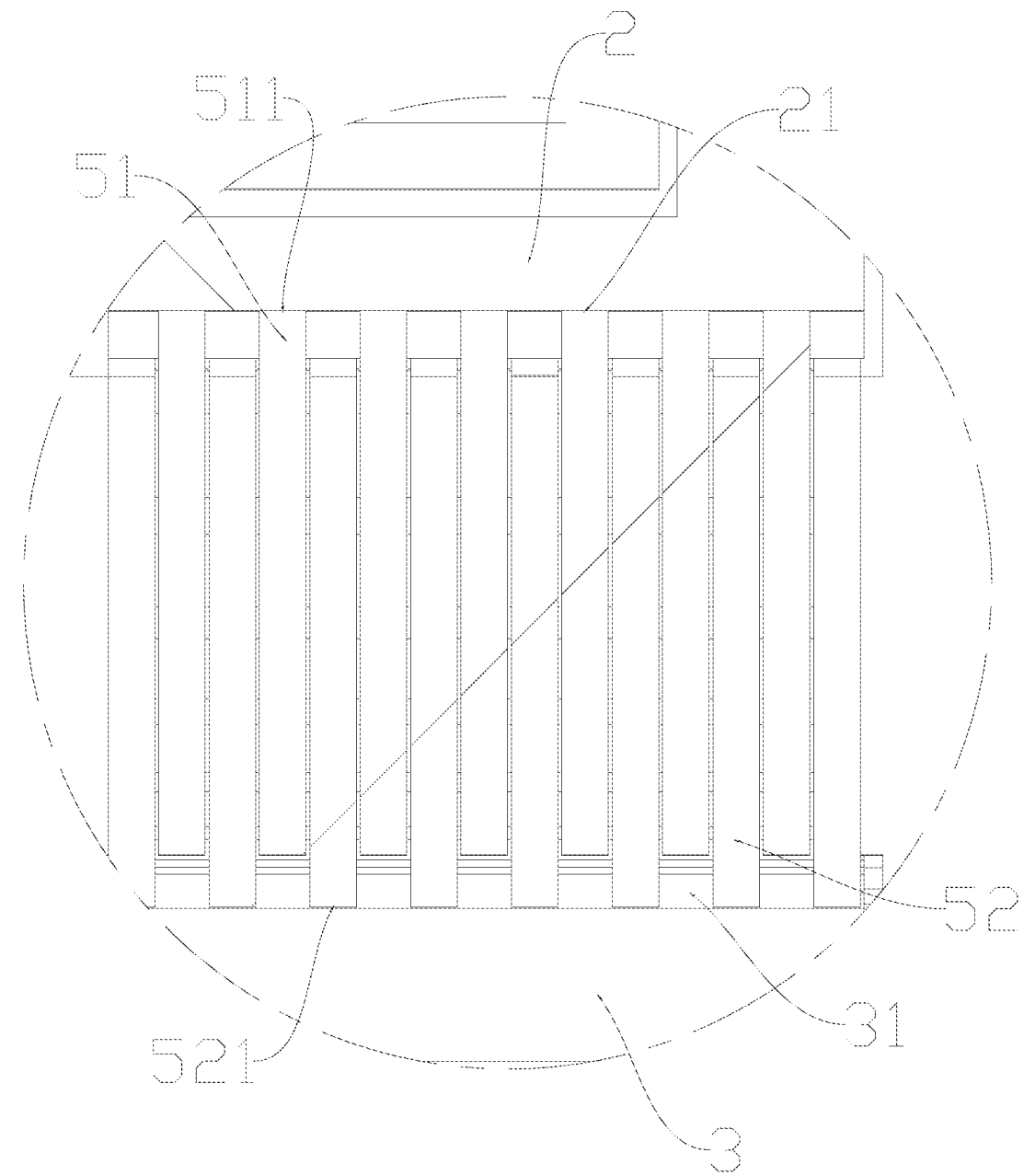
FIG. 4 is an enlarged view at A in FIG. 3.
Figure 8:
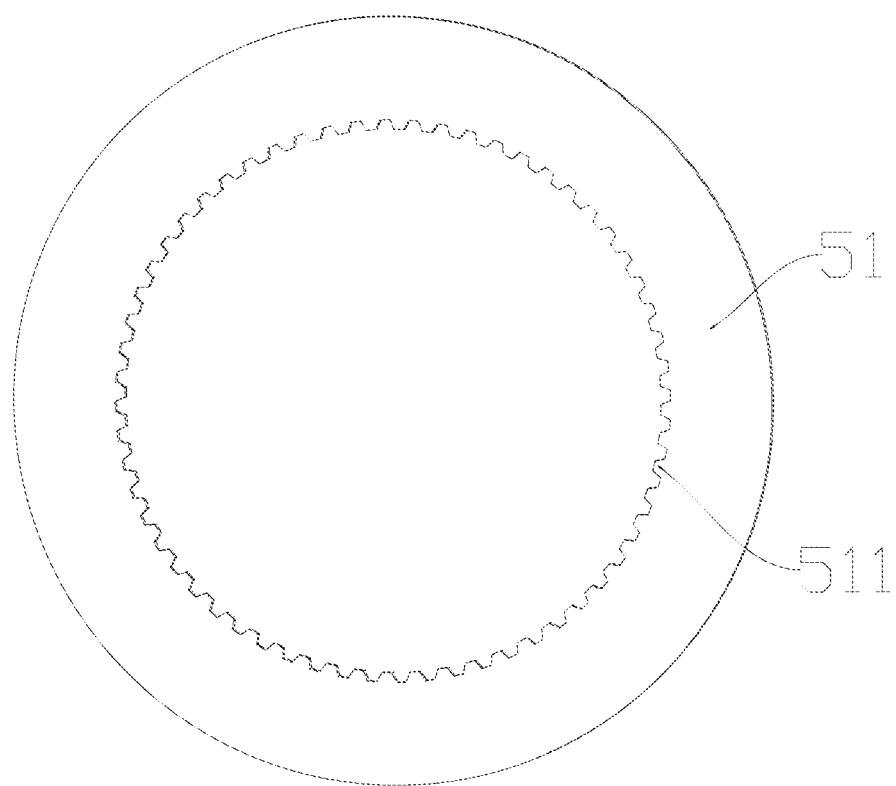
FIG. 8 is a schematic diagram of the structure of the first friction plate according to an embodiment of the present invention.
Figure 9:
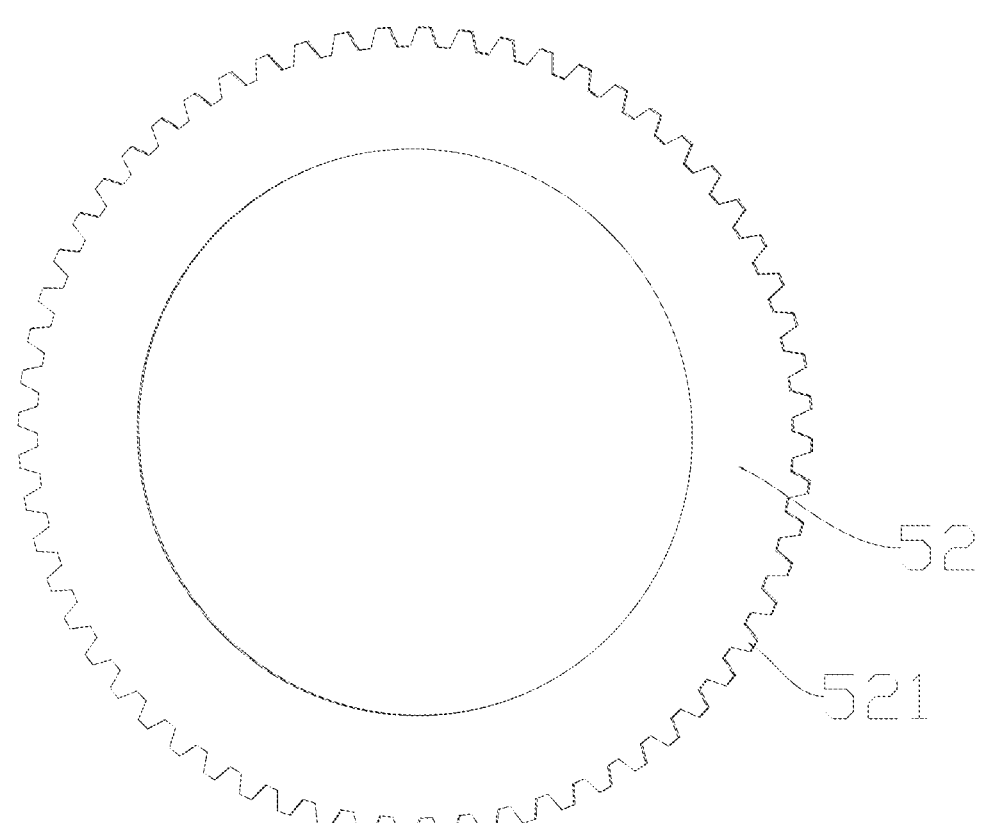
FIG. 9 is a schematic diagram of the structure of the second friction plate according to an embodiment of the present invention.

Specifically, in this embodiment, as shown in FIGS. 4 and 8, the friction plates 5 connected to the first driving gear 2 are first friction plate 51. As shown in FIGS. 4 and 9, the friction plates 5 connected to the second driving gear 3 are second friction plates 52. A plurality of first friction plates 51 and a plurality of second friction plates 52 are alternately provided subsequently in the direction the axis of the first driving gear 2. In this way, the friction between the first friction plate 51 and the second friction plate 52 can be increased as much as possible, so as to ensure that the torque transferred between the first driving gear 2 and the second driving gear 3 is maximized. However, it should be understood that in some embodiments, the friction plates 5 can also be arranged in a way other than the above, for example, two first friction plates 51 per group and two second friction plates 52 per group are alternately arranged.

Furthermore, specifically, in this embodiment, the plurality of friction plates 5 are friction rings provided coaxially with the first driving gear 2. In some embodiments, the friction plates 5 may also be other shapes, such as a circular arc.

As shown in FIGS. 6~9, the outer annular surface of the first driving gear 2 is a first tooth-shaped surface 21. The inner annular surface of the second driving gear 3 is a second tooth-shaped surface 31. The inner annular surface of the first friction plate 51 is a third tooth-shaped surface 511 engaged with the first tooth-shaped surface 21, and the outer annular surface of the second friction plate 52 is a fourth tooth-shaped surface 521 engaged with the second tooth-shaped surface 31. It should be understood that, in addition to the embodiment mentioned above, the first driving gear 2 and the second driving gear 3 can be connected to the friction plate 5 in other ways, as long as they do not depart from the scope of the present invention.

Figure 3:
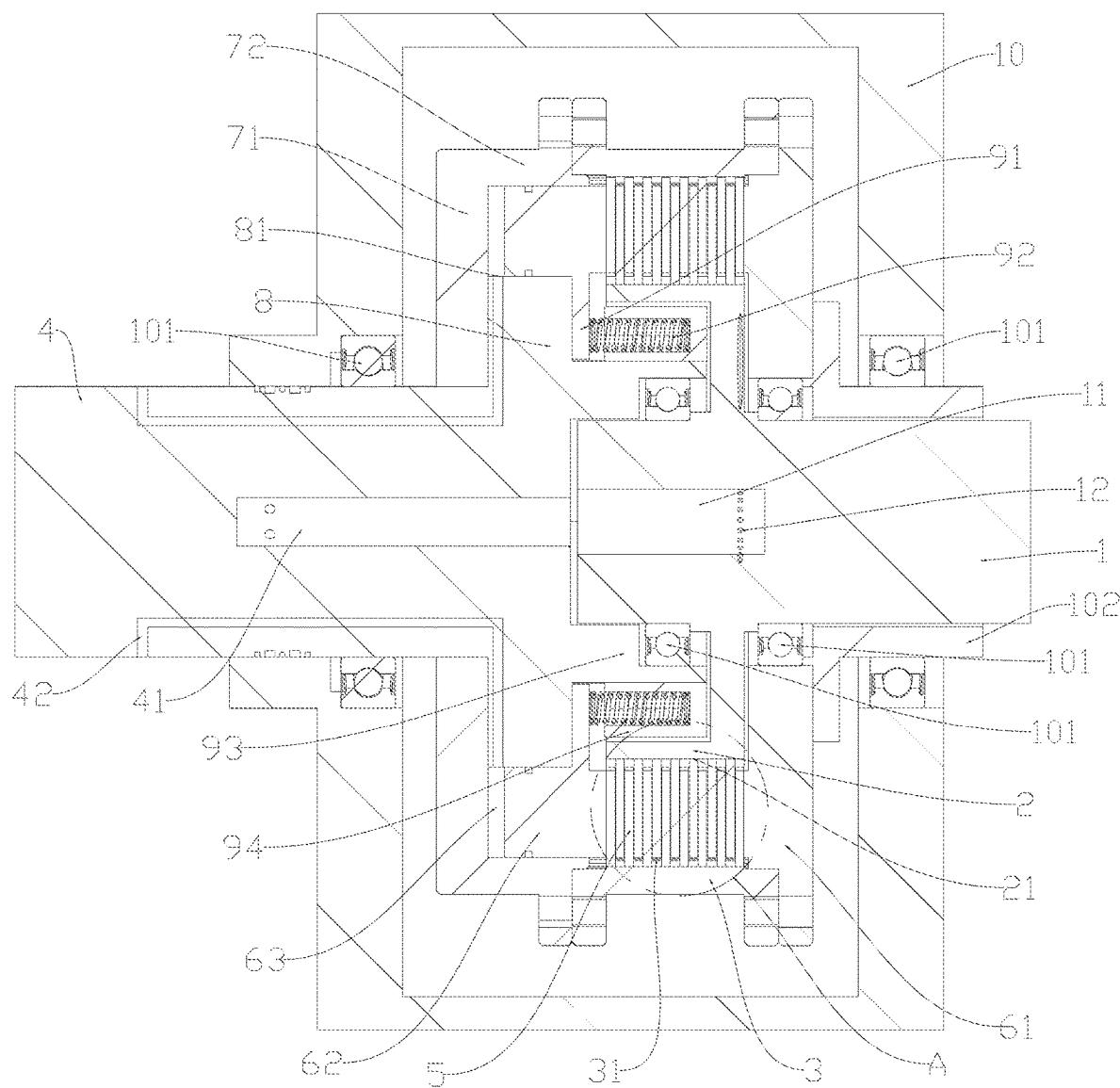
FIG. 3 is a cross-sectional view of A-A in FIG. 2.
Figure 5:
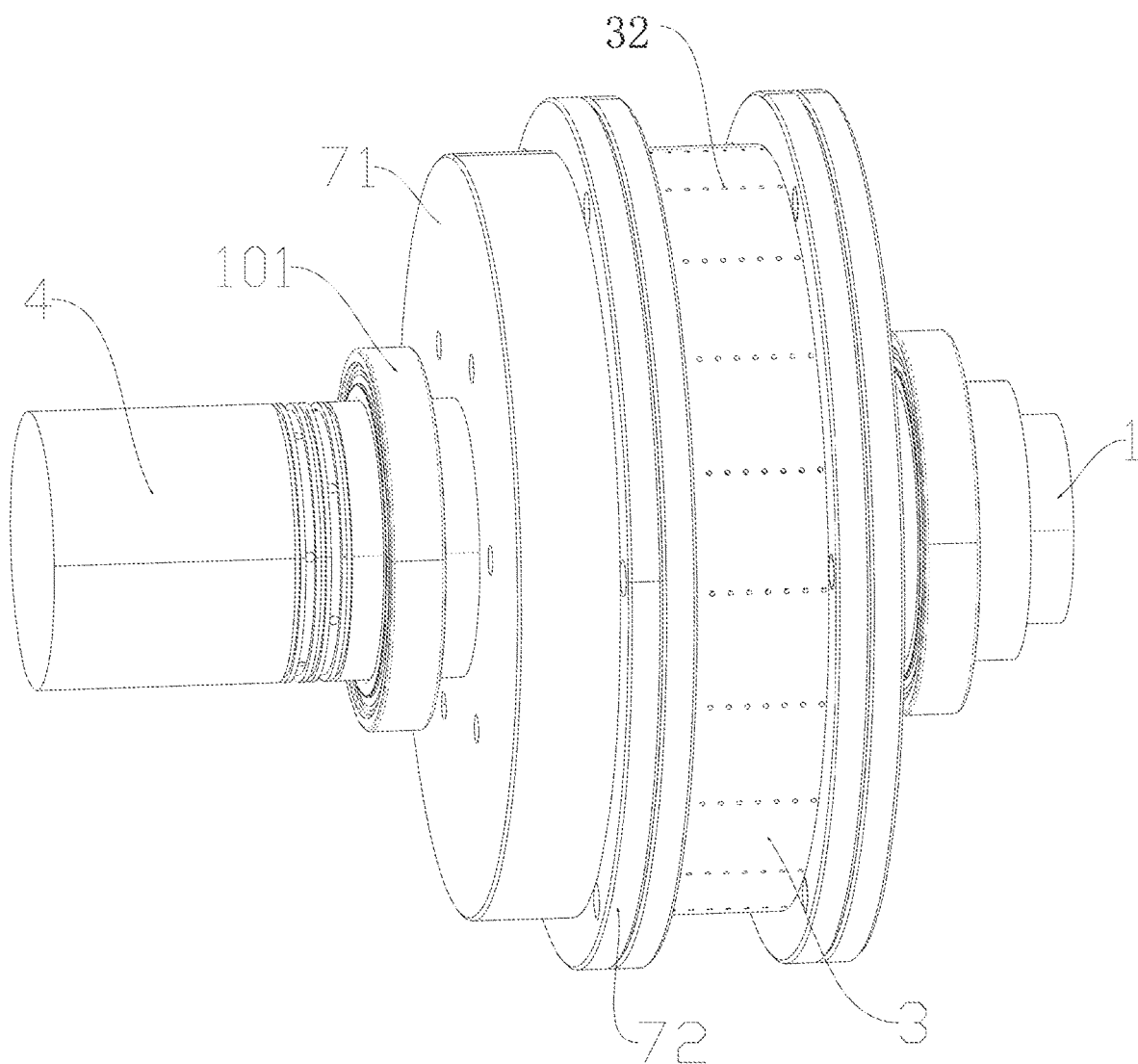
FIG. 5 is a schematic diagram of the structure of the friction simulating device according to the embodiment of the present invention after removal of the housing.

As showed in FIGS. 3 and 5, the driving mechanism includes: a pressing member 61, a piston 62 and a cylinder 63, wherein the pressing member 61 and piston 62 operably press against both sides of the plurality of friction plates 5 in the direction of the axis of the first driving gear 2 respectively. The pressing member 61 is fixedly connected to the second driving gear 3. An end of the piston 62 away from the friction plates 5 is located in the cylinder 63, and is sealedly slideable along an inner wall of the cylinder 63 in the direction of the axis of the first driving gear 2. A liquid filling port 81 is provided on a segment of the cylinder 63 away from the friction plates 5. When it is necessary to press the friction plates 5, hydraulic oil may be filled into the cylinder 63 through the liquid filling port 81, and the piston 62 is pushed to move in a direction toward the friction plate 5, thereby pressing the friction plates 5 against the pressing member 61. When it is necessary to release the friction plates 5, the hydraulic oil is no longer filled in, the hydraulic oil can be pumped out of the cylinder 63, and the piston 62 is pushed to move in a direction away from the friction plate 5, thereby releasing the friction plates 5.

According to another embodiment, the driving mechanism may include: the pressing member 61 mentioned above and a drive cylinder. The pressing member 61 and the drive cylinder are provided oppositely on both sides of the above plurality of friction plates 5 in the direction of the axis of the first driving shaft 1. A top rod of the drive cylinder abuts against the plurality of friction plates 5 mentioned above, and the drive cylinder can be an air cylinder or an oil cylinder.

As shown in FIGS. 3 and 5, the pressing member 61 is an annular end plate, which is sleeved on the radial outer side of the first driving shaft 1. The radial outer end of the annular end plate is fixedly connected to the second driving gear 3. The annular end plate is connected to the first driving shaft 1 by a bearing 101, so that the annular end plate and the first driving shaft 1 can be rotated relative to each other. In some embodiments, the pressing member 61 may also be a second friction plate 52 of a plurality of friction plates 5 at the outermost end away from the piston 62, which is fixed to the second driving gear 3. For example, the second friction plate 52 is welded to the second driving gear 3.

Furthermore, as shown in FIGS. 3 and 5, the friction simulating device 103 further comprises: an annular cover body and an intermediate ring 8. The annular cover body is coaxially fixed to the radial outer annular surface of the second driving shaft 4, and the radial outer end of the annular cover body is fixedly connected to the second driving gear 3, so that a coaxial fixed connection between the second driving shaft 4 and the second driving gear 3 can be made by the annular cover body. The intermediate ring 8 is located near an inner side of the annular cover body and is coaxially fixedly connected to the second driving shaft 4, wherein the annular cover body and the intermediate ring 8 enclose to form the cylinder 63.

As shown in FIGS. 3 and 5, the annular cover body includes: an annular cover 71 and a connecting plate 72, wherein the annular cover 71 is provided parallel to the annular end plate. The annular cover 71 is provided on the radial outer side of the second driving shaft 4 and is fixedly connected to the second driving shaft 4. The connecting plate 72 is provided perpendicular to the annular cover 71 and is fixedly connected to the annular cover 71 and the second driving gear 3, respectively. The intermediate ring 8 is located near the inner side of the annular cover 71 and is coaxially fixedly connected to the second driving shaft 4. The connecting plate 72, the annular cover 71 and the intermediate ring 8 enclose to form the above-mentioned cylinder 63. The piston 62 is sealedly slidable along the radial outer annular surface of the intermediate ring 8 and is sealedly slidable along the radial inner annular surface of the connecting plate 72. As shown in FIG. 3, the liquid filling port 81 is located on the intermediate ring 8.

The arrangement described above allows the annular cover body to be used to connect the second driving gear 3 and the second driving shaft 4 as well as to act as the housing of the cylinder 63, thus maximizing the space utilization inside the friction simulating device 103 and reducing the size of the friction simulating device 103.

Furthermore, as shown in FIGS. 3 and 5, the driving mechanism further comprises a pressing ring 91 and a rebound member 92. The pressing ring 91 is connected to the radial inner side of the piston 62, and the rebound member 92 is provided on a side of the pressing ring 91 facing toward the pressing member 61. The rebound member 92 presses against the pressing ring 91. The rebound member 92 can push the ring 91 to move in a direction away from the pressing member 61. When the friction plates 5 are to be released, in this embodiment, the rebound member 92 is used to push the piston 62 to move in the direction away from the pressing member 61, and the hydraulic oil in the cylinder 63 flows back, the distance between the respective friction plates 5 increases, and the friction between the respective friction plates 5 decreases.

In order to be able to fix the rebound member 92, as shown in FIGS. 3 and 5, the friction simulating device 103 further comprises a fixing ring 93 and a U-ring 94, wherein the fixing ring 93 is fixed on a side of the intermediate ring 8 facing toward the pressing member 61, and the U-ring 94 is fixed on a radial outer annular surface of the fixing ring 93. The U-ring 94 is located on the radial inner side of the first driving gear 2. The rebound member 92 includes a plurality of springs, which are provided inside the U-ring 94 at intervals in a circumferential direction of the U-ring 94. As shown in FIG. 3, the fixing ring 93 is located on the radial outer side of the first driving shaft 1 and is connected to the first driving shaft 1 by a bearing 101, thereby enabling relative rotation between the first driving shaft 1 and the fixing ring 93.

Figure 6:
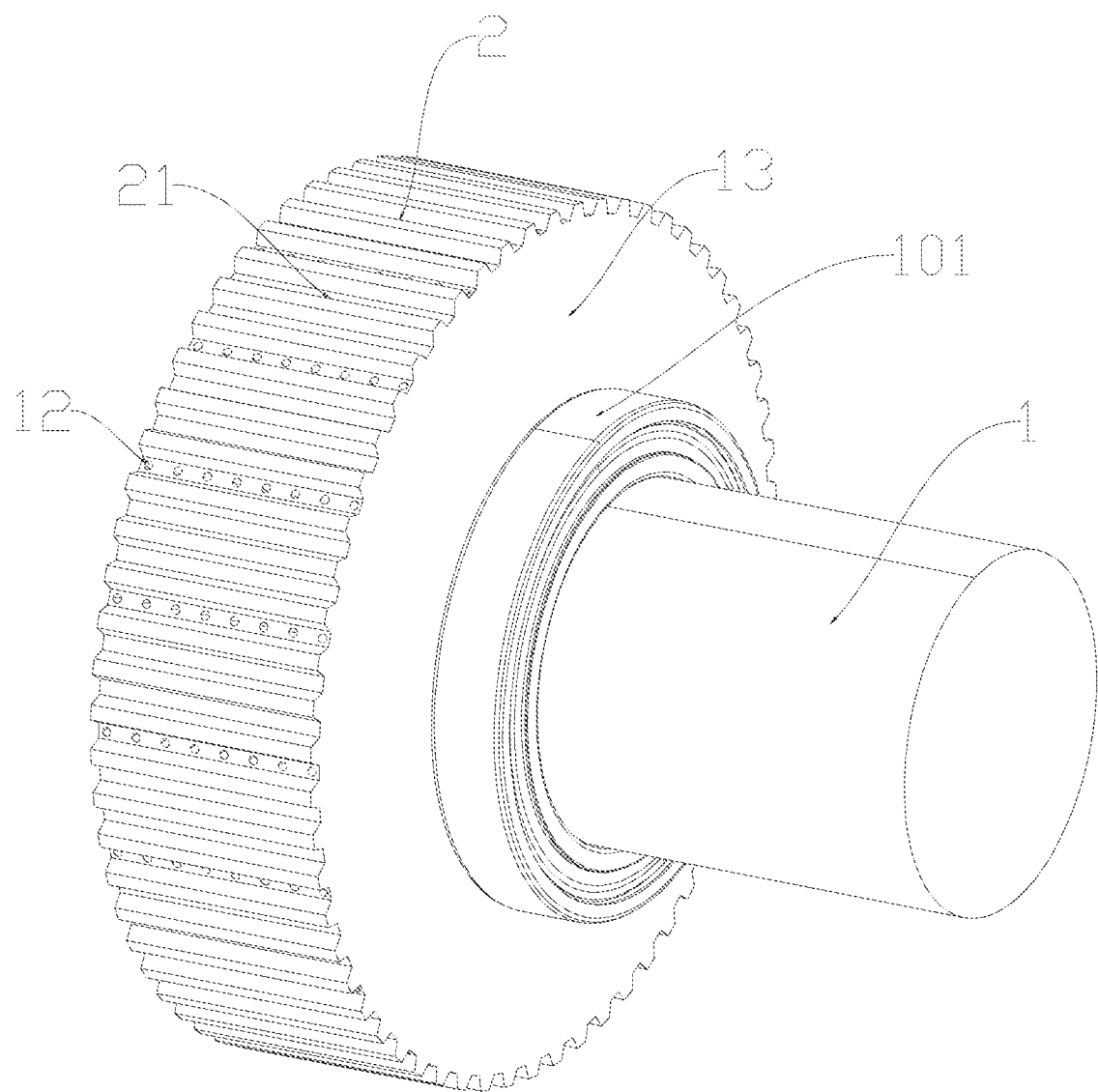
FIG. 6 is a schematic diagram of the structure of the first driving shaft, the connecting ring and the first driving gear according to an embodiment of the present invention after assembly.

Furthermore, as shown in FIG. 3, the first driving shaft 1 is coaxially fixedly connected to the first driving gear 2 by a connecting ring 13. The first driving shaft 1 has a hollow oil storage cavity 11 inside. As shown in FIG. 3, the first driving shaft 1 and the second driving shaft 4 are coaxially spaced apart relative to each other. As shown in FIGS. 3 and 6, the friction simulating device 103 further comprises a plurality of cooling oil passages 12. Each of the cooling oil passages 12 is connected to the oil storage cavity 11 at one end and is open at the outer annular surface of the first driving gear 2 at the other end. Therefore, when the first driving gear 2 and the first driving shaft 1 are rotated, the oil in the oil storage cavity 11 is thrown through the cooling oil passages 12 onto the outer annular surface of the first driving gear 2, thereby cooling the respective friction plates 5 which are connected to the outer annular surface of the first driving gear 2.

A plurality of cooling oil passages 12 are arranged radially on the connecting ring 13 and the first driving gear 2, so that the cooling oil cools the respective friction plates 5 as much as possible. In this embodiment, as shown in FIGS. 3 and 6, the cooling oil passages 12 are divided into a plurality of groups, outlets of each group of cooling oil passages 12 are arranged subsequently in the direction of the axis of the first driving shaft 1. The plurality of cooling oil passages 12 are provided around the direction of the axis of the first driving gear 2.

Figure 7:
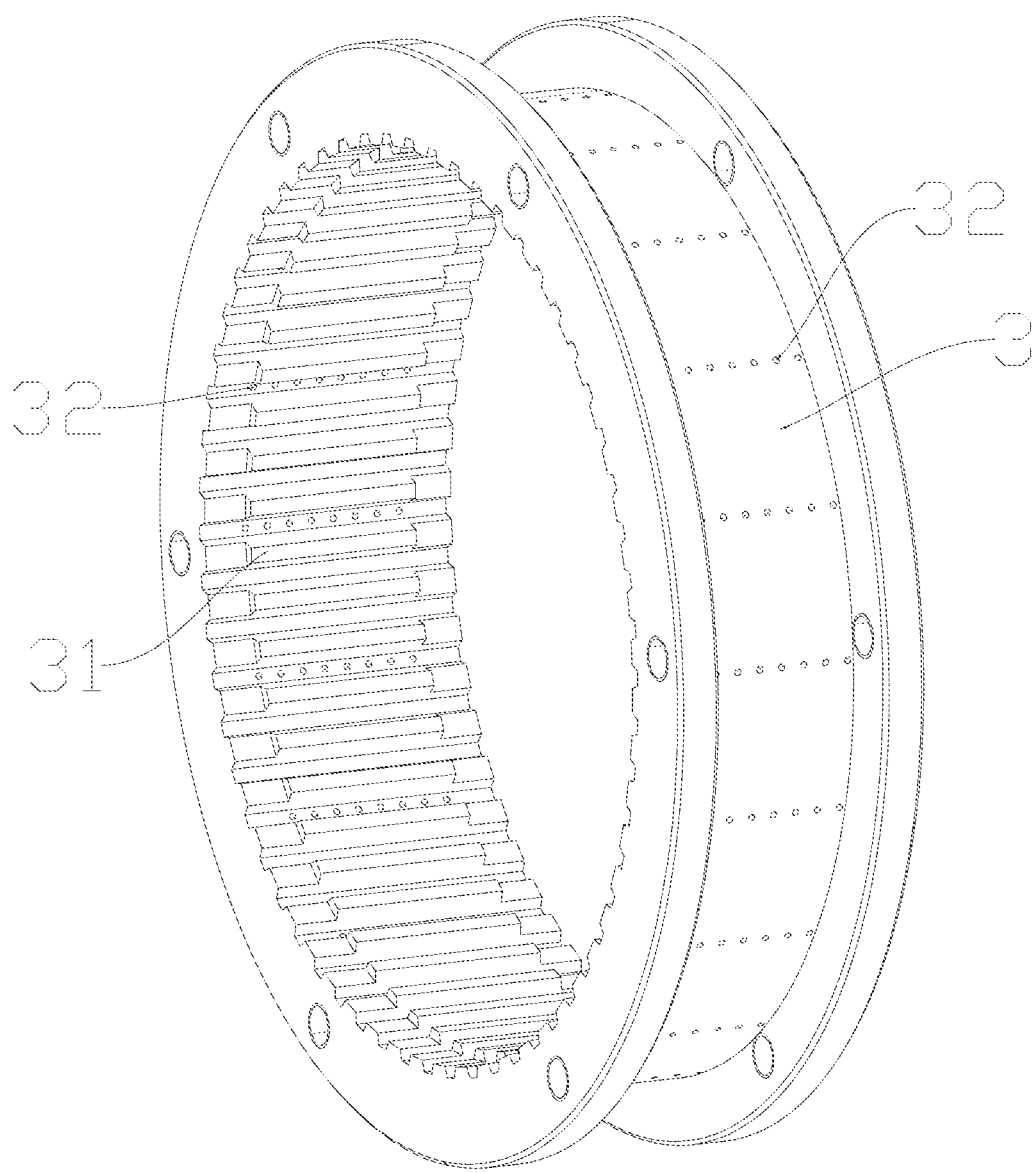
FIG. 7 is a schematic diagram of the structure of the second driving gear according to an embodiment of the present invention.

Furthermore, as shown in FIG. 7, a plurality of oil discharge passages 32 are provided on the second driving gear 3 in the radial direction, and the plurality of oil discharge passages 32 runs through the second driving gear 3 in the radial direction. The oil discharge passages 32 are divided into a plurality of groups, each group of oil discharge passages 32 is arranged subsequently in the direction of the axis of the second driving shaft 4. The plurality of oil discharge passages 32 are provided around the direction of the axis of the second driving gear 3. Therefore, the cooling oil can be thrown out of the respective friction plates 5 through the oil outlet passages 32 on the second driving gear 3 after passing through the respective friction plates 5.

Furthermore, as shown in FIGS. 1 and 3, the friction simulating device 103 further comprises: a housing 10 covered over the first driving gear 2, the second driving gear 3 and the plurality of friction plates 5. The first driving shaft 1 and the second driving shaft 4 pass through a housing wall of the housing and are both rotatably connected to the housing 10. An oil outlet is provided on the housing 10. The hydraulic oil is thrown into the housing 10 through the oil outlet passage 32 on the second driving gear 3, and the cooling oil in the housing 10 can be discharged through this oil outlet.

Furthermore, as shown in FIG. 3, the friction simulating device 103 further comprises a supporting ring 102 provided between the first driving shaft 1 and the housing 10. The supporting ring 102 is fixed to the radial outer annular surface of the first driving shaft 1. The housing 10 is connected to the supporting ring 102 by a bearing 101. The housing 10 is also connected to the second driving shaft 4 by the bearing 101, so that the housing 10 does not move when the first driving shaft 1 and the second driving shaft 4 are rotated.

Furthermore, as shown in FIG. 3, in order to enhance the stability of the friction simulating device 103, the second driving shaft 4 and the first driving shaft 1 are provided coaxially relative to each other, the clearance between the first driving shaft 1 and the second driving shaft 4 is very small. An oil inlet cavity 41 connected to the oil storage cavity 11 is provided in the second driving shaft 4, and the oil inlet cavity 41 is connected to the oil outlet through a pipe; wherein the friction simulating device 103 further comprises a pressure pump provided on the pipeline. The above-mentioned arrangement enables the recycling of the cooling oil. Of course, in some embodiments, it is possible not to provide the oil inlet cavity 41, but to connect the pipe directly to the oil storage cavity 11.

Furthermore, as shown in FIG. 3, the friction simulating device 103 further comprises a pressure oil passage 42 provided on the second driving shaft 4 and the intermediate ring 8. An inlet of the pressure oil passage 42 is open on the second driving shaft 4 and an outlet of the pressure oil passage 42 is connected to the liquid filling port 81.

Since the friction simulating device 103 includes a plurality of friction plates 5, and some of the friction plates 5 are connected to the first driving gear 2 in the circumferential direction, and the other friction plates 5 are connected to the second driving gear 3 in the circumferential direction, so that the transmission of power between the first driving gear 2 and the second driving gear 3 can be achieved by the friction between the plurality of friction plates 5. In addition, the friction simulating device 103 further comprises a driving mechanism, which is capable of pressing or releasing the friction plates 5. When the driving mechanism presses the friction plates 5, the torque transferred between the first driving shaft 1 and the second driving shaft 4 increases. When the driving mechanism releases the friction plates 5, the torque transferred between the first driving shaft 1 and the second driving shaft 4 decreases.

Figure 10:
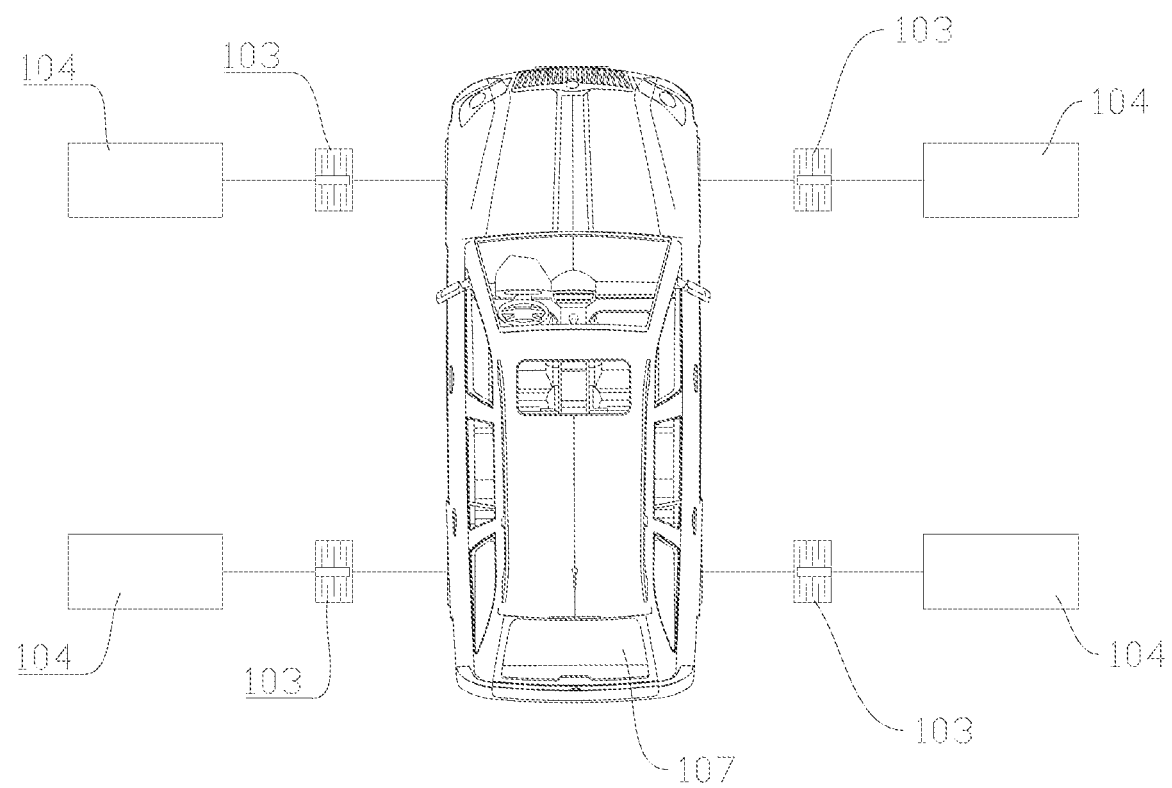
FIG. 10 is a schematic diagram of the structure of the friction simulating device and dynamometer according to the embodiment of the present invention after assembly with the tested vehicle.

Therefore, in the process of testing, as shown in FIG. 10, the first driving shaft 1 is connected to the driving shaft of the vehicle, the second driving shaft 4 is connected to the dynamometer 104, a load is provided to the vehicle through the dynamometer 104, and the friction applied to the vehicle by the ground during the actual movement of the vehicle is simulated through the friction simulating device 103. The magnitude of the friction can be adjusted by the driving mechanism. The friction simulating device 103 and the dynamometer 104 can realistically simulate a scene of the vehicle traveling on the road.

The plurality of first friction plates, the first driving shaft and the first driving gear and the tested vehicle 107 are equivalent to a vehicle traveling on a real road, while the plurality of second friction plates, the second driving gear, the second driving shaft and the dynamometer 104 are equivalent to the ground. When the dynamometer 104 drives the tested vehicle 107, the friction between the plurality of first friction plates and the plurality of second friction plates is equivalent to the friction between the wheels and the ground when the vehicle is traveling on the real road. In the above way, it is simple and convenient to realistically simulate the scene of the tested vehicle traveling on the road, instead of simulating the state of the tested wheel in a way using the low-inertia dynamometer 104 by dramatically switching the rotational speed. Since the vehicle testing device in this application can simulate the normal travel scene of the vehicle very realistically, it can greatly improve the accuracy of the test of the tested vehicle 107, and also can improve the convenience.

As can be seen from the above, since the friction simulating device 103 is used to simulate the friction of the road, the dynamometer 104 does not have to follow the speed of the wheel with high dynamics (as long as follow speed of the wheel corresponding to the speed of the vehicle), the requirements of the dynamometer 104 are relatively low, and the dynamometer 104 is not necessary to be a low inertia permanent magnet synchronous dynamometer 104. The dynamometer 104 can be asynchronous dynamometer 104.

Specifically, when doing the ABS test, the maximum torque transferred of the friction simulating device 103 is set by the driving mechanism according to the maximum friction F1 that the road to be tested can apply to the vehicle. Assuming that the radius of a tire is R, the maximum torque transferred set by the friction simulating device 103 is set to be FC=F1*R, when the braking force of the vehicle does not exceed the maximum torque transferred set by the friction simulating device 103, the friction simulating device 103 is in a locked state, i.e., the friction plates 5 are closely connected to each other without slipping, and the driving shaft of the vehicle is in a rotating state at this time. The speed of the driving shaft of the vehicle is the same as that of the dynamometer 104. The rotational speed corresponding to the dynamometer 104 is the speed of the wheel corresponding to the speed of the vehicle.

And when the braking force of the vehicle exceeds the set maximum torque of the friction simulating device 103 (i.e., when the driver slams on the brakes during the actual process), slipping among the friction plates 5 in the friction simulating device 103 starts (equivalent to slipping between the wheels and the ground when the vehicle is traveling on the ground). The vehicle 107 tested controls the speed of wheel to be quickly reduced to the lock, while the speed of the dynamometer 104 is still corresponding to the speed of the vehicle at this time (because the dynamometer 104 does not need to have a very high change rate of rotational speed, using the asynchronous motor can also meet the test requirements). After the ABS system detects a wheel being locked, the braking force of the vehicle is reduced, and the braking torque of the vehicle brake plate is lower than the maximum torque transferred of the friction simulating device 103 (i.e., when the vehicle is traveling on the ground, the braking torque of the brake plate is lower than the friction applied to the tires by the ground), the wheel rotates and quickly reach a speed which is same as the speed of the wheel corresponding to the speed of the vehicle.

In the process described above, the friction that the friction simulating device 103 can transmit to the driving shaft of the vehicle is equivalent to the friction that the ground applies to the wheels during normal travel of the vehicle. In the above way, during test of the vehicle, the force that can be transmitted by the friction simulating device 103 can be adjusted as needed to simulate the friction applied to the wheels by a various types of ground. For example, when simulating a vehicle traveling on ice, the maximum torque transferred of the friction simulating device 103 can be set to the friction applied to the wheels by the ice surface. When simulating a vehicle traveling on a tarmac road, the maximum torque transferred of the friction simulating device 103 can be set to the friction applied to the wheels by the tarmac road.

The state of the vehicle when doing a TCS test is similar to those state mentioned above, so it is not explained in detail.

The use of the friction simulating device 103 in this application greatly improves the accuracy and convenience of vehicle test, because it can realistically simulate the friction applied to the wheels by the ground during the travel of the vehicle.

It should be understood that although the above embodiments provide only one kind of application for the friction simulating device 103, the friction simulating device 103 can also be applied in other situations where the friction needs to be simulated.

The preferred embodiments of the present invention have been described in detail above, but it should be understood that aspects of the embodiments can be modified to provide additional embodiments using aspects, features and ideas from various patents, applications and publications, if desired.

Considering the detailed description above, it is possible to make these and other variations to the embodiments. In general, the terms used in the claims should not be considered as limiting the specific embodiments disclosed in the specification and claims, but should be understood to include all possible embodiments together with the full scope of equivalents enjoyed by those claims.

It will be understood by those of ordinary skill in the art that each of the above embodiments is a specific embodiment for realizing the present invention, while in practical application various changes can be made to it in form and details without deviating from the spirit and scope of the present invention.

The invention claimed is:

1. A friction simulating device, comprising:
   a first driving shaft;
   a first driving gear being coaxially fixedly connected to the first driving shaft;
   a second driving gear being located on a radial outer side of the first driving gear and being provided coaxially with the first driving gear;
   a second driving shaft being coaxially fixedly connected to the second driving gear;
   a plurality of friction plates being provided subsequently between the first driving gear and the second driving gear in a direction of an axis of the first driving gear, wherein some of the friction plates are axially movably connected to the first driving gear in a circumferential direction, and the other friction plates are axially movably connected to the second driving gear in the circumferential direction;
   a driving mechanism operably pressing or releasing the friction plates in a direction of an axis of the first driving shaft; wherein the driving mechanism comprises: a pressing member, a piston and a cylinder, wherein the pressing member and the piston operably press against both sides of the plurality of friction plates in the direction of the axis of the first driving gear respectively;

the pressing member is fixedly connected to the second driving gear;

an end of the piston away from the plurality of friction plates is located in the cylinder and is sealedly slideable along an inner wall of the cylinder in the direction of the axis of the first driving gear;

a liquid filling port is provided on a segment of the cylinder away from the plurality of friction plates.

2. The friction simulating device according to claim 1, wherein the friction plates connected to the first driving gear and the friction plates connected to the second driving gear are alternately arranged subsequently in the direction of the axis of the first driving gear.

3. The friction simulating device according to claim 1, wherein the plurality of friction plates are friction rings provided coaxially with the first driving gear.

4. The friction simulating device according to claim 1, wherein the pressing member is an annular end plate being sleeved on a radial outer side of the first driving shaft, and a radial outer end of the annular end plate is fixedly connected to the second driving gear.

5. The friction simulating device according to claim 1, wherein the friction simulating device further comprises:

an annular cover body being fixed coaxially to a radial outer annular surface of the second driving shaft, wherein a radial outer end of the annular cover body is fixedly connected to the second driving gear;

an intermediate ring being affixed to an inner side of the annular cover body and coaxially fixedly connected to the second driving shaft, wherein the cylinder is formed by the annular cover body and the intermediate ring.

6. The friction simulating device according to claim 5, wherein the driving mechanism further comprises:

a pressing ring being connected to a radial inner side of the piston;

a rebound member being provided on a side of the pressing ring toward the pressing member, wherein the rebound member abuts against the pressing ring, and the rebound member operably pushes the pressing ring to move in a direction away from the pressing member.

7. The friction simulating device according to claim 1, wherein the first driving shaft is coaxially fixedly connected to the first driving gear by a connecting ring, and the first driving shaft has a oil storage cavity inside;

the friction simulating device further comprises a plurality of cooling oil passages, each of the cooling oil passages is connected to the oil storage cavity at one end and is open at an outer annular surface of the first driving gear at the other end.

8. The friction simulating device according to claim 7, wherein a plurality of oil discharge passages are provided on the second driving gear in a radial direction of the second driving gear, and the plurality of oil discharge passages run through the second driving gear in the radial direction.

9. The friction simulating device according to claim 7, wherein the cooling oil passages are divided into a plurality of groups, outlets of each group of the cooling oil passages are arranged subsequently in the direction of the axis of the first driving shaft, and the plurality of groups of the cooling oil passages are provided around the direction of the axis of the first driving gear.

10. The friction simulating device according to claim 9, wherein the friction simulating device further comprises a housing covering over the first driving gear, the second driving gear and the plurality of friction plates, wherein the first driving shaft and the second driving shaft both pass through a housing wall of the housing and are rotatably connected to the housing;

wherein the housing is provided with an oil outlet.

11. The friction simulating device according to claim 10, wherein the first driving shaft and the second driving shaft are provided coaxially and are opposite to each other, the second driving shaft is provided with an oil inlet cavity connected to the oil storage cavity, and the oil inlet cavity is connected to the oil outlet through a pipe;

wherein the friction simulating device further comprises a pressure pump provided on the pipe.

\* \* \* \* \*